(12) United States Patent
Viaud (10) Patent No.: US 6,640,699 B2
(45) Date of Patent: Nov. 4, 2003

(54) ROUND BALER BALE CHAMBER HAVING SIMPLIFIED DISCHARGE ARRANGEMENT (75) Inventor: Jean Viaud, Gray (FR)

(73) Assignee: Deere & Co., Moline, IL (US)

( * ) Notice: Subject to any disclaimer, the term of this patent is extended or adjusted under 35 U.S.C. 154(b) by 0 days.

(21) Appl. No.: 10/163,156

(22) Filed: Jun. 4, 2002

(65) Prior Publication Data

US 2003/0029329 A1 Feb. 13, 2003

(30) Foreign Application Priority Data

Jun. 6, 2001 (DE) .......................................... 01 112 927

(51) Int. Cl.[7] .............................................. B65B 13/00
(52) U.S. Cl. .............................. 100/7; 100/87; 100/88; 100/89
(58) Field of Search ................................ 100/88, 87, 5, 100/3, 7, 15, 8, 89; 56/341, 343

(56) References Cited

U.S. PATENT DOCUMENTS

| 3,964,246 A | | 6/1976 | Kopaska | 56/341 |
|---|---|---|---|---|
| 4,262,478 A | | 4/1981 | Pentith | 56/341 |
| 4,391,187 A | * | 7/1983 | Koning et al. | 100/88 |
| 4,483,247 A | * | 11/1984 | Coeffic | 100/88 |
| 4,698,955 A | * | 10/1987 | Wagstaff | 56/341 |
| 4,956,968 A | * | 9/1990 | Underhill | 56/341 |
| 5,182,987 A | * | 2/1993 | Viaud | 100/87 |
| 5,224,328 A | * | 7/1993 | Viaud | 56/341 |
| 5,931,089 A | | 8/1999 | Viesselmann et al. | 100/88 |

FOREIGN PATENT DOCUMENTS

| EP | 0 970 599 A1 | 1/2000 |
|---|---|---|
| FR | 2 591 849 A | 6/1987 |

* cited by examiner

Primary Examiner—Allen Ostrager
Assistant Examiner—Shelley Self (57) ABSTRACT A round baler has a bale chamber surrounded by bale forming means running over stationary and moveable rollers. Some moveable rollers are carried by arms which are located outside opposite side walls of the bale chamber. This enables a bale to be formed within the spacing between the side walls and to be ejected by raising the arms carrying moveable rollers to open the bale chamber.

9 Claims, 13 Drawing Sheets

ROUND BALER BALE CHAMBER HAVING SIMPLIFIED DISCHARGE ARRANGEMENT

FIELD OF THE INVENTION

The invention refers to a round baler having a bale chamber covered at least substantially by side walls and flexible bale forming means.

BACKGROUND OF THE INVENTION

U.S. Pat. No. 5,931,089 discloses a round baler having multiple rollers rotatably journalled in a chassis to carry a set of belts. An inlet to a bale chamber is provided downstream of a pick-up between two fixed rollers. A span of belts bridging this inlet is engaged by incoming crop and deflects towards the bale chamber to create a loop. The incoming crop increases the bale in said loop until it reaches a maximum diameter. As soon as the maximum diameter is reached, a gate carrying one of the rollers limiting the inlet is raised and the loop opens to the ground to dump the bale.

In "FMO 141 B D-00, Hay and Forage Harvesting" of Deere & Company pages 153 and 154 is disclosed a type of round baler which had been common in the 1970's. This type had two spaced side walls each of one piece and a pair of arms to which is attached a frame carrying three rollers over which belts are trained. In the bottom area a bottom conveyor of a wide belt is provided, on which the bale is supported during formation. When the round baler is empty, a lower front roller assumes a position immediately above said bottom conveyor and close to an inlet of the bale forming chamber. The more the bale approaches its maximum diameter, the bigger will be a part of the bale, that extends over the rear edges of side walls.

The problem to be solved with respect to these prior art balers is either the weight of the gate which has to be handled in order to get the bale out of the bale chamber or the costs of a bottom conveyor.

SUMMARY OF THE INVENTION

According to the present invention, there is provided a large round baler having an improved bale forming arrangement for overcoming the aforementioned problems associated with prior art balers.

The objectives of the present invention are accomplished by a structure including a roller located outside the bale chamber to train the bale forming means and to carry the bale, and for allowing just this roller to move in order to open the bale chamber at the rear of the baler to dump the bale onto the ground. Moving just one roller results in much less weight being moved than when moving a complete gate with several rollers and stiff side walls, as is the case with the prior art balers. Furthermore, a single roller may be moved on a quite complex track as opposed to a part of a circle as given by the movement of the gate. The arm supporting the single roller may be pivoted about a single axis or moved a long a path either defined by a guide or achieved by a multi-sectional arm having controls between the sections for varying their relative positions. A bottom conveyor is omitted, since the arms with the roller may be positioned under the bale and since the arm can slip under the side walls to the front and close to the center of gravity of the bale, the arms may carry the weight without being exposed to extreme bending forces.

Two rollers on the pair of arms permit a better routing of the bale forming means and to keep sections of the belts away from other moving parts. The distance between the rollers may be fixed or variable, whereas a variation of the distance may be achieved by power actuators like hydraulic motors or the like.

While in principle it would be possible to control the position of the arm manually by means of a link or the like, it is more convenient, more powerful, more flexible, and less dangerous to do it via a power actuator like a hydraulic motor or an electric motor and preferably either remote controlled or controlled by means of sensors, etc.

The routing of the bale forming means, the tension in them, and the location of the loop delimiting the bale chamber can be adjusted, modified, and controlled, if a second arm with one or more rollers is provided to train the flexible bale forming means.

While in general it would be possible to have an individual pivot axis for each pair of arms, both pairs of arms could be moved without limits and conflicts, if they are rotated or pivoted about the same axis, with different arm lengths preferably.

An overload as well as a high tension in the flexible bale forming means is achieved by a roller applied by an actuator, like a spring or any other tension means. Such an actuator or power actuator can be a gas spring, a mechanical coil or leaf spring or a hydraulic piston moved against a preferably variable pressure. Preferably this roller is kept in a guide to guarantee a roller movement and thus a tensioning or loosening of the bale forming means without canting or twisting.

A carrier on the moveable arms with one or more rollers on it permits to bring the rollers in the right position and to route the bale forming means as needed. While the position of the carrier is fixed as opposed to moveable, it could be attached in different positions depending on the configuration of the baler or the like.

Fastening the carrier and the rollers with it moveably with respect to the arms allows the rollers to be brought into an optimum position during the movement of the arm about its pivoting axis. This could be helpful to change the tension in the bale forming means, to route the bale forming means through tights areas, etc.

In order to have an inlet of fixed width which corresponds to the infeed geometry of an upstream pick-up, two rollers of a fixed distance may be used, which rollers may be a support roller in the bottom and a stripper roller on the top. One of these rollers could be located on the arm and swing away, when the bale chamber is opened.

If the bale forming means are trained over the stationary roller kept rotatably by the chassis and delimiting the inlet on the side remote from the bale chamber, no starter roller is required and thus there is no risk of wrapping in that area. Furthermore the crop gets in immediate contact with the bale forming means and can start rolling.

In an embodiment, in which the flexible bale forming means are trained over the stationary roller(s) on the side facing the bale chamber, a small chamber is provided, which has a driven starter roller at one side, which assists in holding the crop and starting the bale core.

The path of the roller or the rollers on the arm(s) is predetermined and easy to achieve, if it follows the contour of the side walls, which may be formed such, that a certain routing of, and tension in, the bale forming means is achieved.

The possibility to change the distance between the side walls allows to produce bales of different size and volume and thus to accommodate to the dimension of a truck or the like. The distance can be varied if the side walls are moved on or with the shafts on which the arms are journalled.

Stops at the arms, roller or carrier fixed on the arms, are useful to act against the bending forces applied to the side walls by the crop. Thus the bale chamber retains a constant width even if it is filled completely. Such stops could contain rollers, gliders or the like.

Belts and chains with slats thereon are excellent bale forming means, since they can be trained in a very flexible way over rollers in different and even changing positions.

If the peripheral edges of the side walls are distant in the plane of their substantial extension from any adjacent or close component, like a frame, pick-up, etc., the rollers on the arms can be moved in a circular path around the side walls to perform an endless cycle.

BRIEF DESCRIPTION OF THE DRAWINGS

The drawing shows two embodiments of the invention explained in the description below.

DESCRIPTION OF THE PREFERRED EMBODIMENT

Figure 1:
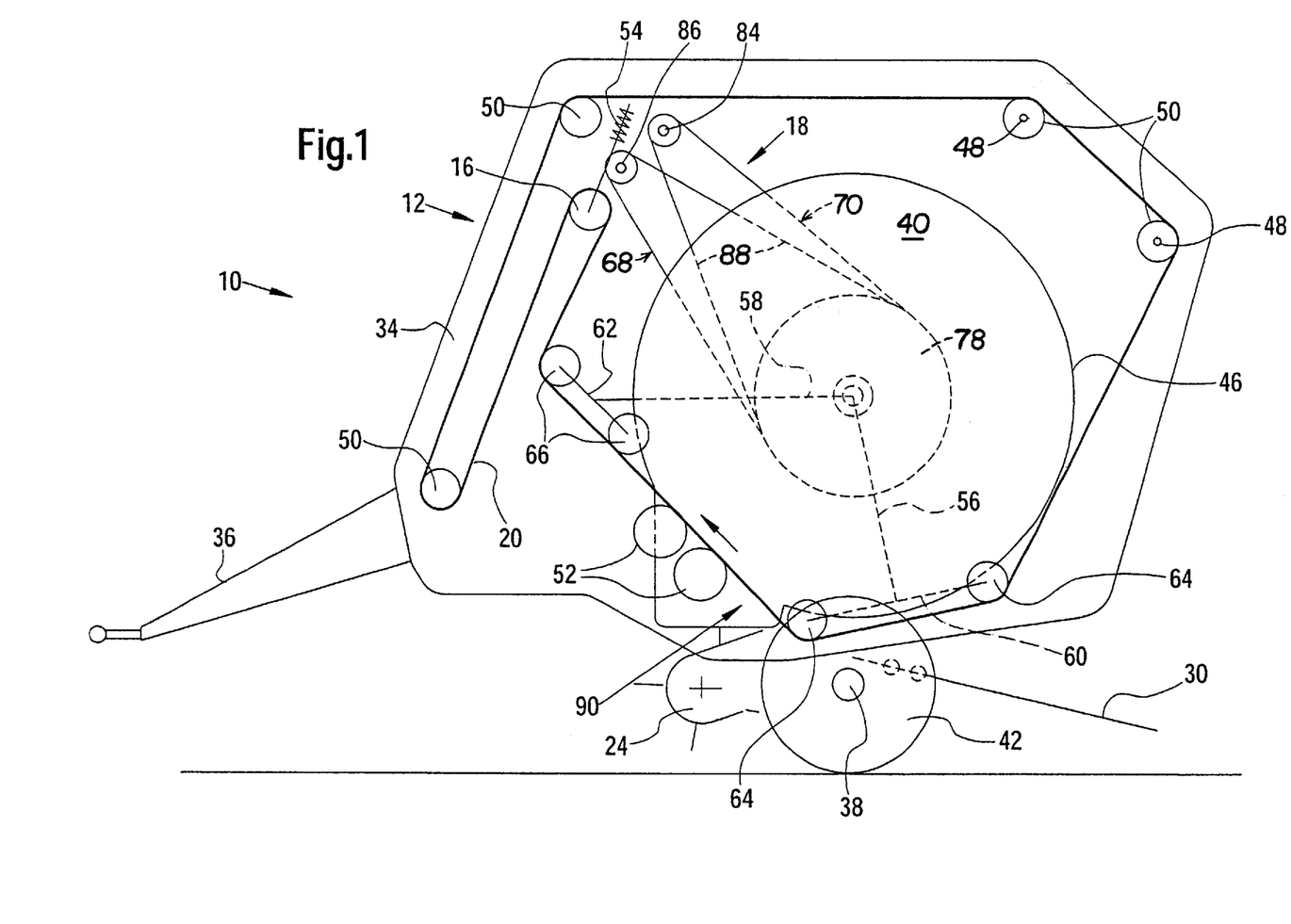
FIG. 1 is a schematic depiction of an empty round baler constructed according to a first embodiment sectional view taken along line 1—1 of FIG. 2.

Referring to FIG. 1, there is shown a round baler 10 comprising a chassis 12, a set of fixed rollers identified more specifically below, a moveable roller 16, an arm-and-roller assembly 18 and flexible bale forming means 20. The round baler 10 is designed substantially in a mirror image with respect to a vertical center plane extending in the travel direction of the round baler 10.

Figure 3:
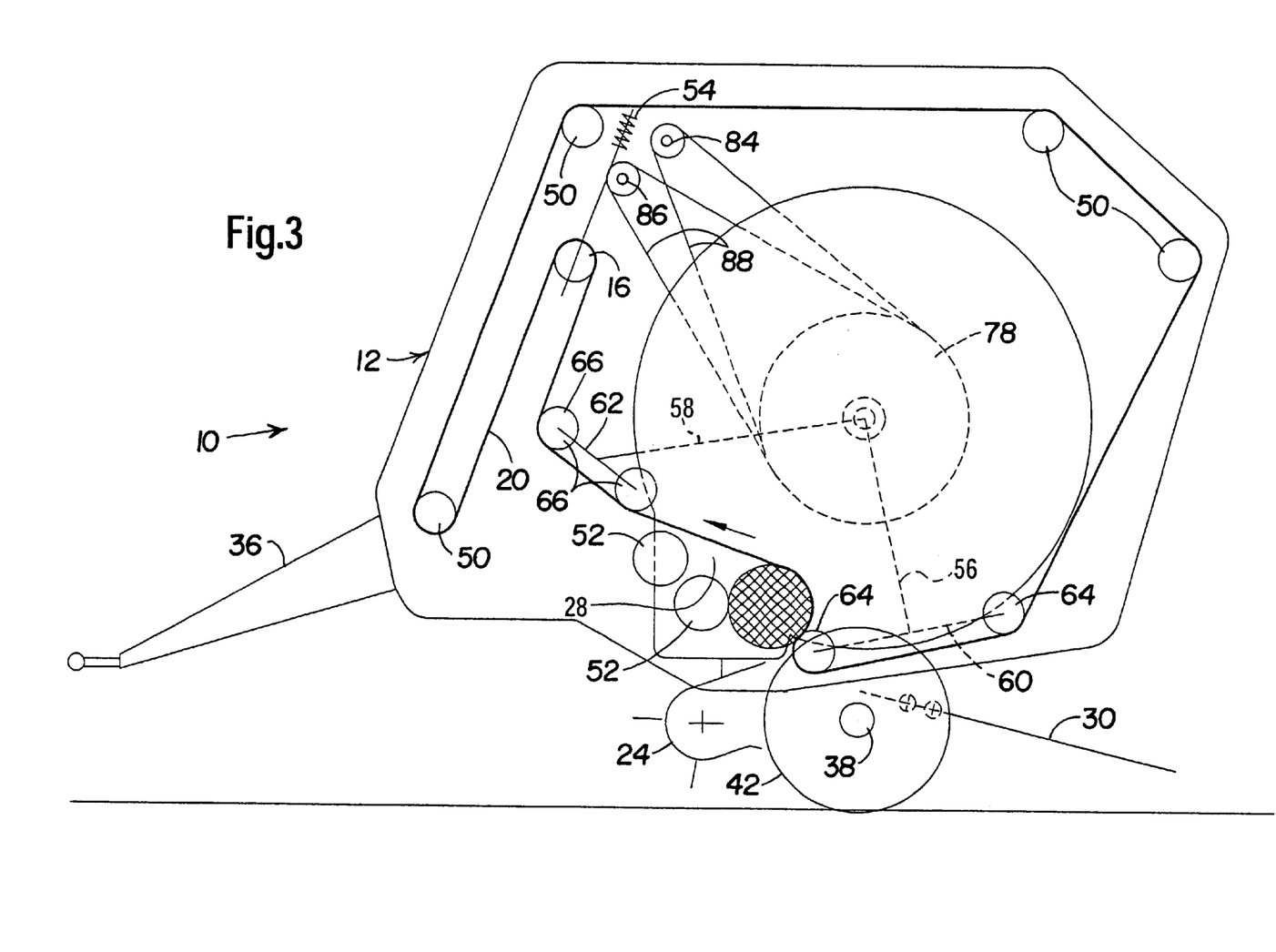
FIG. 3 is a view of the round baler of FIG. 1 showing a slightly filled bale chamber.
Figure 4:
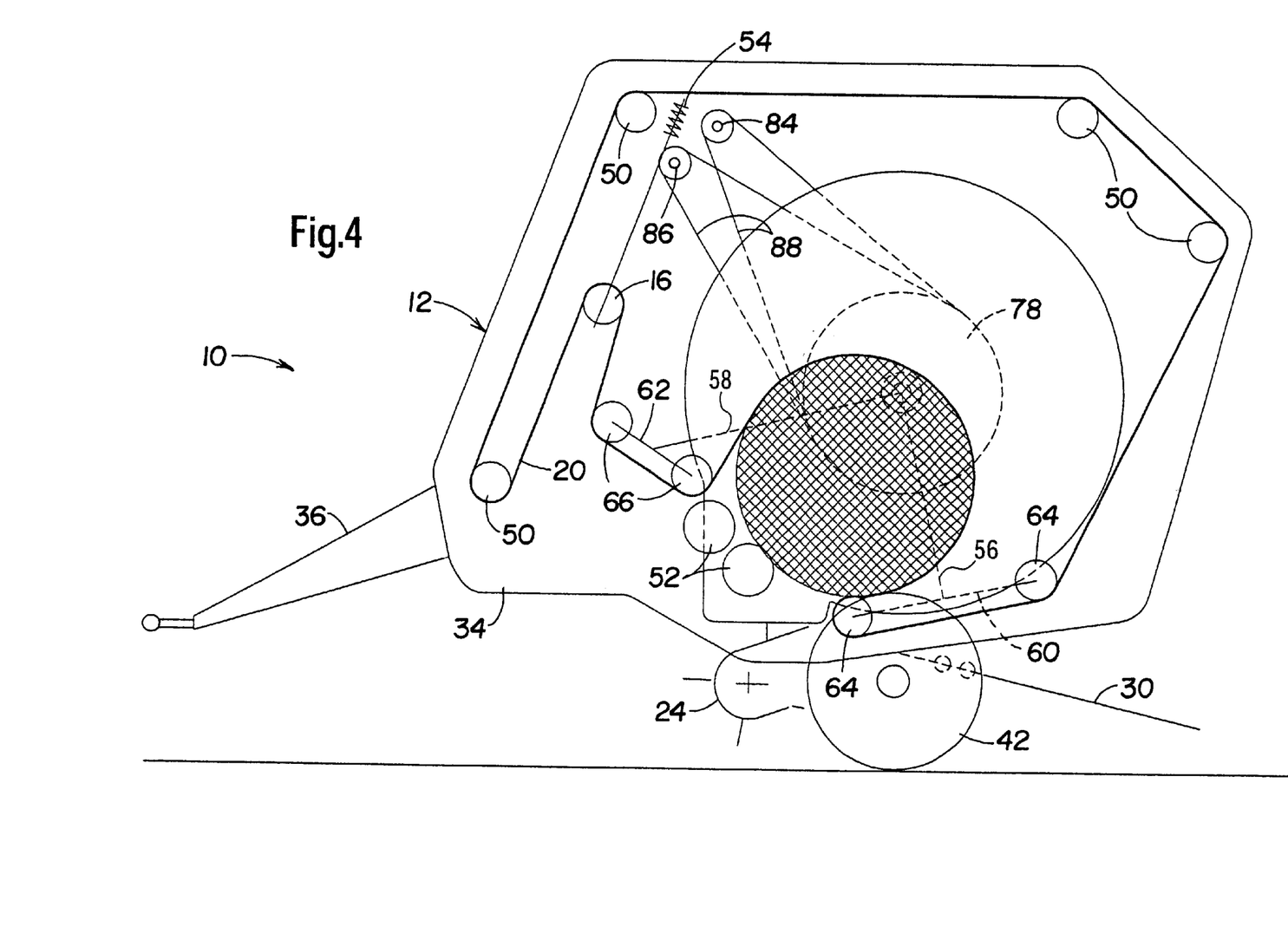
FIG. 4 is a view of the round baler of FIG. 1 showing a partially filled bale chamber.

The round baler 10 serves to receive crop lying on the ground and to form a cylindrical bale 22 (see FIG. 5) therefrom. The round baler 10 may be of the pulled type, as shown, or of the self-propelled type. In order to gather crop from the ground, a pick-up 24 is provided, which delivers crop directly (see FIGS. 1 and 3 to 6), or indirectly via by means of an intermediate conveyor 26 (see FIGS. 7 to 9), to a bale chamber 28 (see FIG. 3), which is variable in size. A finished bale 22 is delivered to the ground by means of a ramp 30. The round baler 10 may also be provided with a twine tying or a net or plastic wrapping device, which is not shown however. Finally, the round baler 10 is equipped with a drive, not shown, receiving power from a prime mover, like a tractor, not shown.

The chassis 12 comprises a frame 34, a tongue 36, an axle 38 and side walls 40.

The frame 34 is understood to be the rigid welded and bolted carrying part of the round baler 10 including shielding and the like. The frame 34 carries, in an usual manner, the pick-up 24 and, if present, the intermediate conveyor 26 as well as the ramp 30 and the drive.

The tongue 36 is attached to the front of the frame 34 and extends forwardly to be coupled to the prime mover.

The axle 38 is attached in the bottom area of the frame 34 and journals wheels 42 at each lateral end to support the round baler 10 on the ground. The wheels 42 are shown as single wheels, but tandem wheels could also be used.

Figure 2:
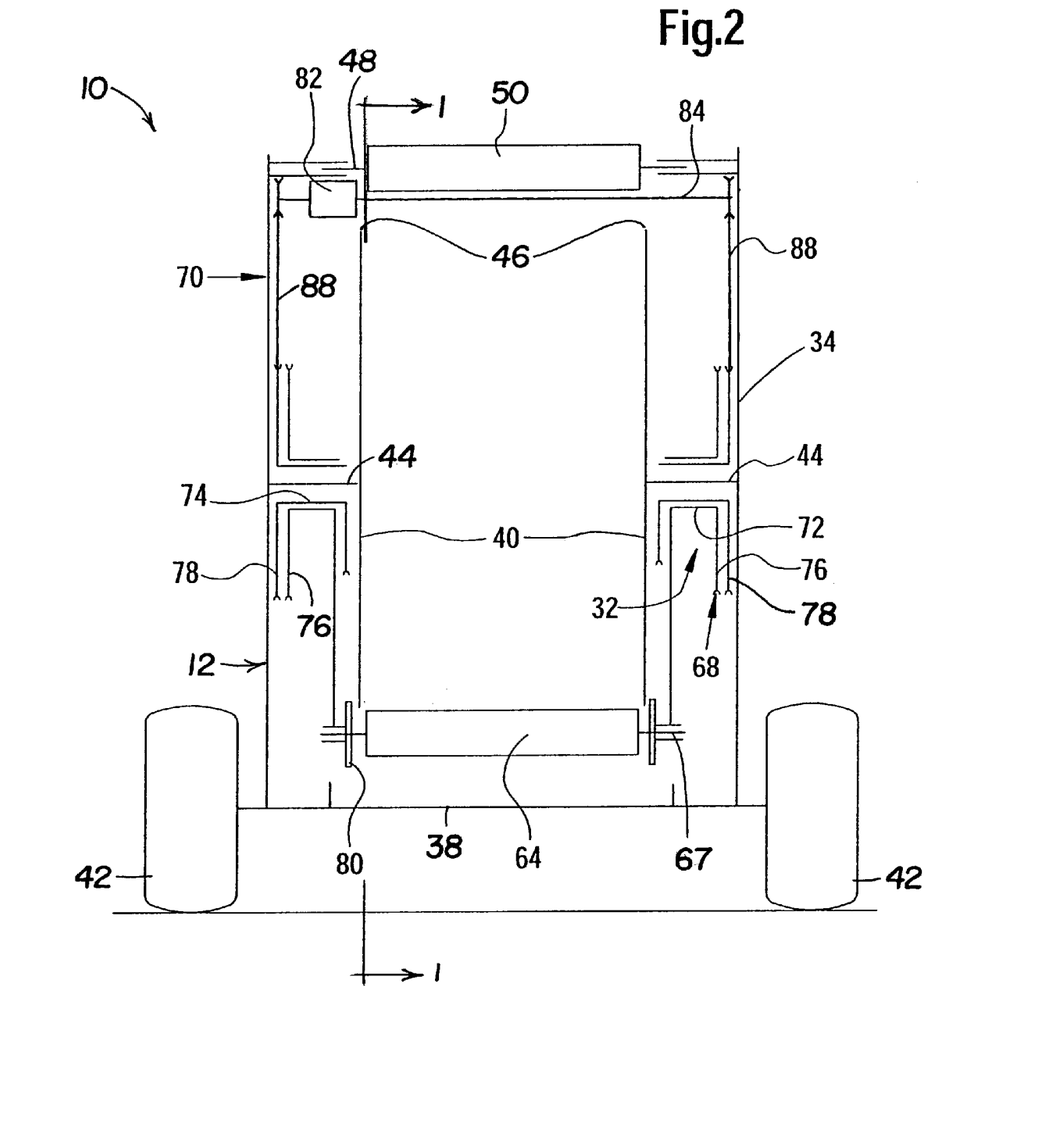
FIG. 2 is a rear view of the round baler of FIG. 1.

The side walls 40 are spaced inwardly from the frame 34, as best seen in FIG. 2. The side walls 40 are each carried on a shaft 44 fixed with its outer end to the frame 34. The side walls 40 include peripheral edges 46 that are free, that is to say, not connected to the frame 34 or to any other component. Moreover a gap is provided between the peripheral edges 46 of the side walls 40 and components in the vicinity of the side walls. The shape and size of the side walls 40 corresponds at least to the maximum cross section of the bale 22. As shown in FIG. 1, the shape of the side walls 40 follows substantially a circle. All in all, the side walls 40 are fixed to the frame 34 in a cantilevered fashion and are reinforced sufficiently to withstand the pressing forces in the direction of the longitudinal axis of the bale 22. The side walls 40 leave a distance between them in which the bale chamber 28 is created. While in general the side walls 40 extend parallel to each other, there may be a slight divergence towards the rear.

The set of fixed rollers include four idler or drive rollers 50 and two starter rollers, which fixed rollers are all made of steel possibly covered partly or totally with a rubber coating or rubber sleeves, not shown. Shafts 48 are provided to journal the set of fixed rollers for rotation in the frame 34 by means of bearings, not shown. All of the fixed rollers run parallel to each other. The idler or drive rollers 50 are located in lower front, upper front, upper rear, and rear positions. As can best be seen in FIG. 6, the upper rear roller 50 is located so as to be vertically above a bale 22 rolling down the ramp 30. The starter rollers 52 are located above the delivery end of the pick-up 24 or of the intermediate conveyor 26, if any. The centers of the starter rollers 52 lie in a plane, which has an inclination to the ground of about 45 degrees. Only a small gap is provided between the starter rollers 52. In a not shown embodiment, more or less than two starter rollers 52 may be provided. In this specific embodiment, the starter rollers 52 are of a bigger diameter than the drive or idler rollers 50. Preferably both starter rollers 52 are driven, whereas it is sufficient if only one of the idler or drive rollers 50 is driven.

The moveable roller 16 is received in a track or on a guide, not shown, and is biased upwardly by an actuator 54, which is shown as a coil spring. Instead of a coil spring, a leaf spring, a gas accumulator or a hydraulic cylinder with a throttle or the like may be used to yieldably resist upward movement of the moveable roller 16. While in the preferred embodiment the moveable roller 16 is located in the front part of the frame 34, it could be located at any other suitable place. It is the purpose of this moveable roller 16 to keep a minimum tension in the bale forming means 20. In order to provide for the proper tension, more than one moveable roller 16 could be provided, and the movement of the actuator 54 could be controlled as a function of signals of the belt tension and/or of the status of the bale forming process.

The roller-and-arm assembly 18 in the embodiments of FIGS. 1 to 9 comprises two sets of arms 56 and 58, carriers 60 and 62, rollers 64 and 66 and drives 68 and 70.

Each arm 56, 58 has an inner end rotatably journalled on the shafts 44 by means of a bushing 72 and 74, which is rotatably fixed with a drive wheel 76 and 78. The outer end of the arms 56, 58 respectively bear the carriers 60 and 62. The arms 56, 58 extend through the space between the side walls 40 and the frame 34 and have a length such, that the rollers 64, 66 at least partially are located outside the side walls 40. In the shown embodiments, the arms 56, 58 are straight and extend radially. However, it would be possible to make each of the arms 56, 58 of two or more sections, which are moveable with respect to each other.

The carriers 60, 62 are here shown supporting respective pairs of rollers 64 and 66 on shafts 67 extending between the carriers 60, 62, but the carriers may be designed to support one or more than two rollers, over which the flexible bale forming means 20 is trained, whereas the location of these rollers 64, 66 defines the path of the runs of the bale forming means 20. The position of the carriers 60, 62 with respect to the arms 56, 58 is preferably fixed, although it would be possible to make it adjustable, too, either remote controlled or controlled by a spring or similar actuator. As to be seen in FIG. 1, carrier 62 is inclined with respect to the arm 58 and carrier 60 makes a right angle with the arm 56 to which it is attached.

The rollers 64, 66 are rotatably received in or on the carriers 58, 60 and extend at least over the full width of the bale chamber 28. In a case in which the distance between the side walls 40 can be varied, the rollers 64, 66 and preferably the carriers 60, 62 extend laterally beyond the side walls 40. According to FIG. 2, stops 80 are provided on shaft 67 of one of the rollers 64, which stops are axially fixed on the shaft 67 and act against an outward movement of the side walls 40. In the preferred embodiment, the rollers 64, 66 rotate with their shafts 67 in the carriers 60, 62. Contrary, each roller 64, 66 could consist of a drum rotating on its respective shaft 67, which itself is rotatably fixed in the respective carrier 60, 62.

The drives 68, 70 each comprise a gear or transmission 82 (see FIG. 2) with two output shafts 84, 86, which each is connected to the drive wheels 76, 78 by means of a drawing means 88, like a chain or a belt. In other not shown embodiments, the transmission 82 or a motor could be attached directly to the drive wheels 76, 78 or to the bushings 72, 74 connected to them. The drives 68, 70 do not perform a constant movement of the arms 56, 58 but perform a stop-and-go movement, i.e., the arms 56, 58 are moved between positions which correspond to the status of the baling cycle. Each drive wheel 76, 78 is connected rotatably fixed to the respective bushing 72, 74 and latter to the respective arm 56, 58. As a result, each pair of arms 56, 58 will rotate as soon as the drive wheel 76, 78 is driven through the pulling means 88 by the respective output shaft 84, 86. While FIG. 2 shows only one transmission 82 and one set of output shafts 84, the side view figures disclose the arrangement and location also of the second set of output shafts 86. While it is convenient to have both transmissions 82 and sets of output shafts 84, 86 close to each other, it is not really necessary. In an alternative arrangement, the drive wheels 76, 78, the bushings 72, 74, the output shafts 82, 84 and the pulling means 88 could be replaced by hydraulic cylinders and/or levers being directly connected to the arms 56, 58, especially as long as the arms 56, 58 perform only a limited pivot movement.

The flexible bale forming means 20 are in the form of endless belts trained over the rollers 16, 50, 64 and 66 and driven by frictional contact between the bale forming means 20 and these rollers 16, 50, 64, 66. In the embodiment of FIGS. 1 to 7, the bale forming means 20 touch the starter rollers 52 tangentially on their inner side only, as long as the bale chamber 28 is empty, as it is shown in FIG. 1. As soon as crop is fed into the bale chamber 28, the bale forming means 20 are deflected opposite and away from an inlet 90 formed between the forward roller 64 of the rear arm 56 and the lowermost starter roller 52. The bale forming means 20 form a loop, the ends of which are located at the forward roller 64 of the rear arm 56 and at the rear roller 66 of the forward arm 58. As soon as the bale 22 reaches its maximum diameter, its cross section is aligned with the major portion of the side walls 40 (see FIG. 5). It can be seen in FIG. 5 that a full sized bale rests with a portion of the bale forming means 20 on the rollers 64 of the rear arms 56. In this situation, the front part of the bale 22 is supported on the starter rollers 52. When no crop is in the bale chamber 28, as shown in FIG. 1, the bale forming means 20 extend in a substantially straight line from the forward roller 64 of the rear arm 56 to the forward roller 66 of the front arm 58 via the starter rollers 52, from where it is routed to the moveable roller 16, to surround it by about 180 degrees, before it reaches the front lower roller 50. In this situation, the moveable roller 16 is in its home position, in which no or almost no force is applied to it by the actuator 54. This is in contrast to the situation illustrated in FIG. 5, wherein the bale chamber 28 is filled completely, with the moveable roller 16 being pulled by the bale forming means 20 to its other extreme end position, in which the maximum force is applied by the actuator 54. As it is apparent from FIGS. 1 to 6, all rollers 50, 64, 66 stay in their position from the beginning to the end of the baling process, only roller 16 is moved to accommodate for the growing bale 22. In the embodiment according to FIGS. 1 to 6, the bale forming means 20 moves clockwise.

The bale 22 is made from straw, hay, cotton, tobacco, any other crop or industrial material like plastic, garbage, paper, clothing, etc. After the bale 22 has attained its desired diameter, which usually, but not necessarily, is its maximum diameter, it is tied with twine, wrapped with net or plastic, and ejected to roll onto the ground via the ramp 30. Since this round baler 10 is of the variable chamber type, the density of the bale 22 is more or less the same throughout the full radius. However, the position of the moveable roller 16 could be controlled such, that different tension is applied to the bale forming means 20 during the baling cycle to achieve a soft core and hard outer layers.

The pick-up 24 is of conventional construction and is attached to the frame 34 by means of lifting means, as this is known.

The intermediate conveyor 26 is of a known type as well, either as a cutting unit or as a mere undershot or overshot conveying rotor, which both deliver the crop from the pick-up 24 to the inlet 90.

The bale chamber 28 is covered on its circumference by the flexible bale forming means 20 and the starter rollers 52 and is open only in the area of the inlet 90. Laterally the bale chamber 28 is covered by the side walls 40.

Figure 5:
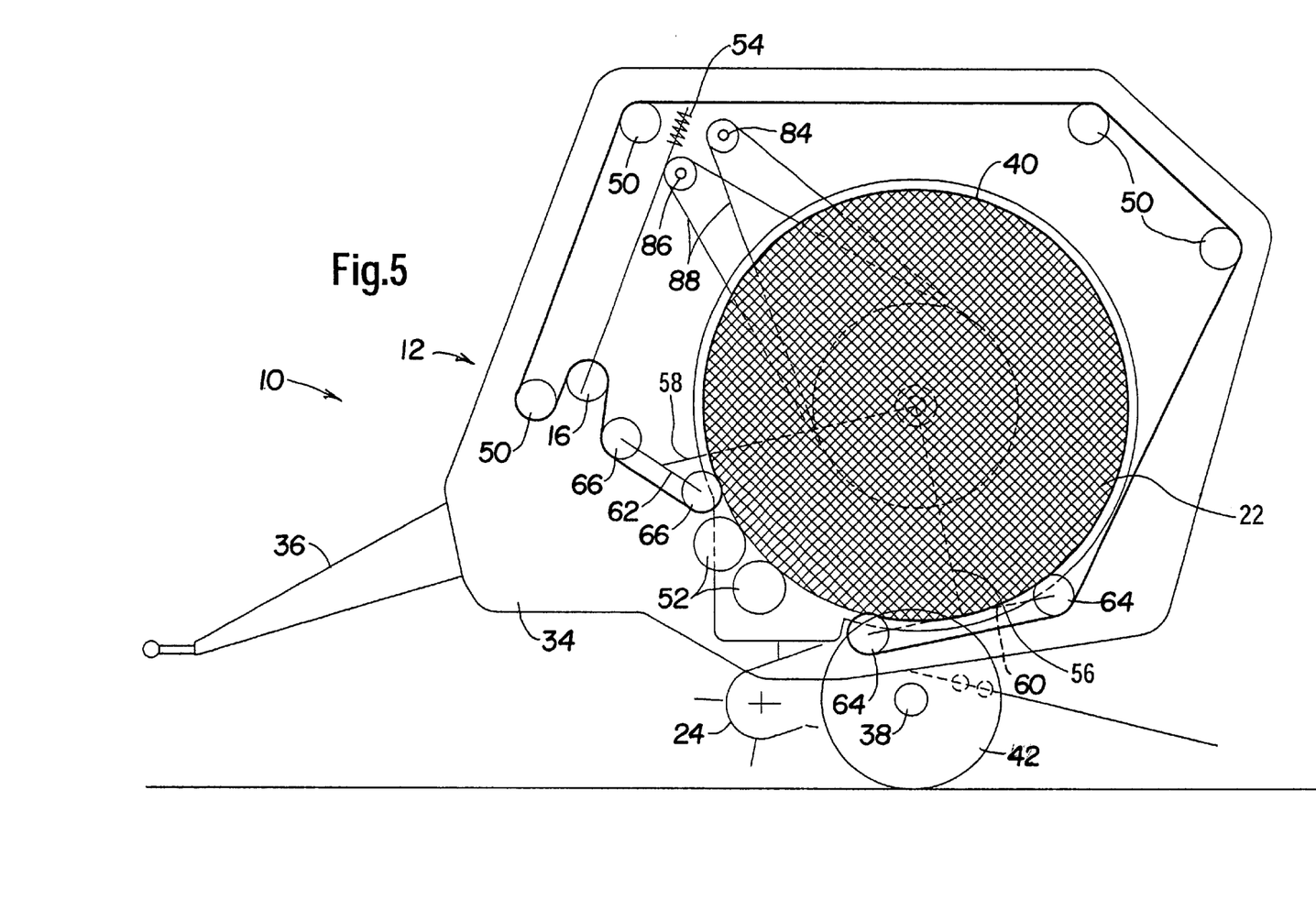
FIG. 5 is a view of the round baler of FIG. 1 showing a filled bale chamber.
Figure 6:
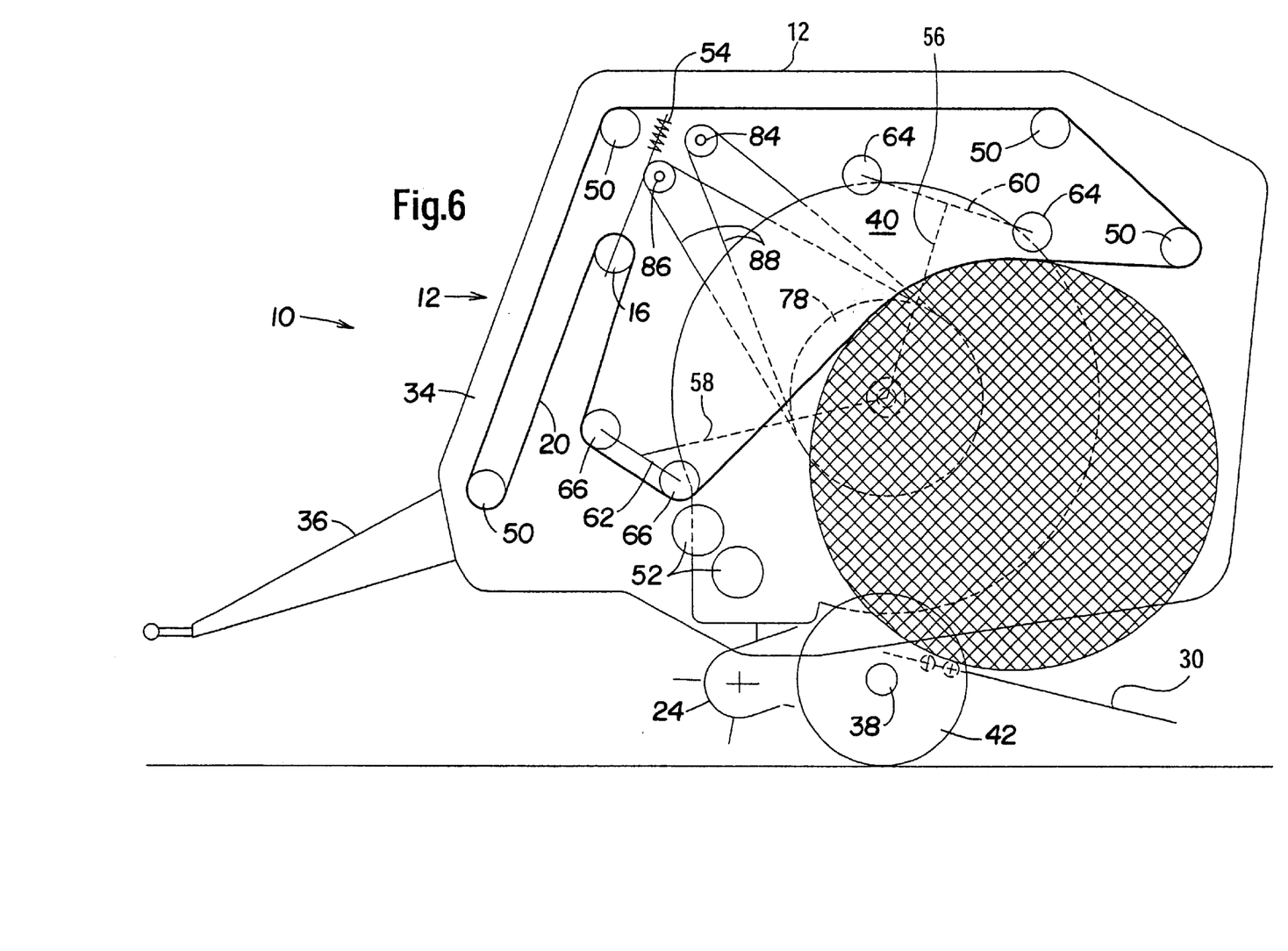
FIG. 6 is a view of the round baler of FIG. 1 showing the unloading of a bale.

According to the description above and starting with FIG. 1 in the initial phase, the rear arms 56 are oriented more or less vertically, such that their front roller 64 is spaced to the rear from the starter roller 52 to form the inlet 90. In this position, both rollers 64 are almost in the same horizontal plane and form a substantial part of the bottom of the bale chamber 28, on which the bale 22 may rest. The front arms 58 extend substantially in a nine o'clock position, such that the rollers 66 are located above the starter rollers 52 and a plane through their longitudinal axles is inclined at about 45° degrees to the ground. The flexible bale forming means 20 bridge the inlet 90. The position of the arms 56 and 58 remains substantially unchanged until the bale chamber 28 is filled completely, as shown in FIG. 5. The only exception is a movement of the front arms 58 counterclockwise so as to move the lower or rear roller 66 very close to the upper starter roller 52 in response to crop being fed into the bale chamber 28. This is to avoid a gap between the upper starter roller 52 and the rear or lower roller 66 of the front arms 58 through which crop could escape. In order to eject the bale 22 from the bale chamber 28, the rear arms 56 are raised, i.e., they are swung counterclockwise with respect to FIG. 1 into the position shown in FIG. 6, in which the rollers 64 are above the bale 22. In this position, the flexible bale forming means 20 is biased by the force of the actuator 54 such that a span of the bale forming means 20 tends to extend along a straight line between the rear roller 66 of the forward arm and the rear fixed roller 50. Since the rear fixed roller 50 is located relatively high, the bale 22 can roll out of the bale chamber 28 and down the ramp 30. As soon as the bale 22 is ejected, both pairs of arms 56, 58 are returned to their home positions, as shown in FIG. 1.

Figure 7:
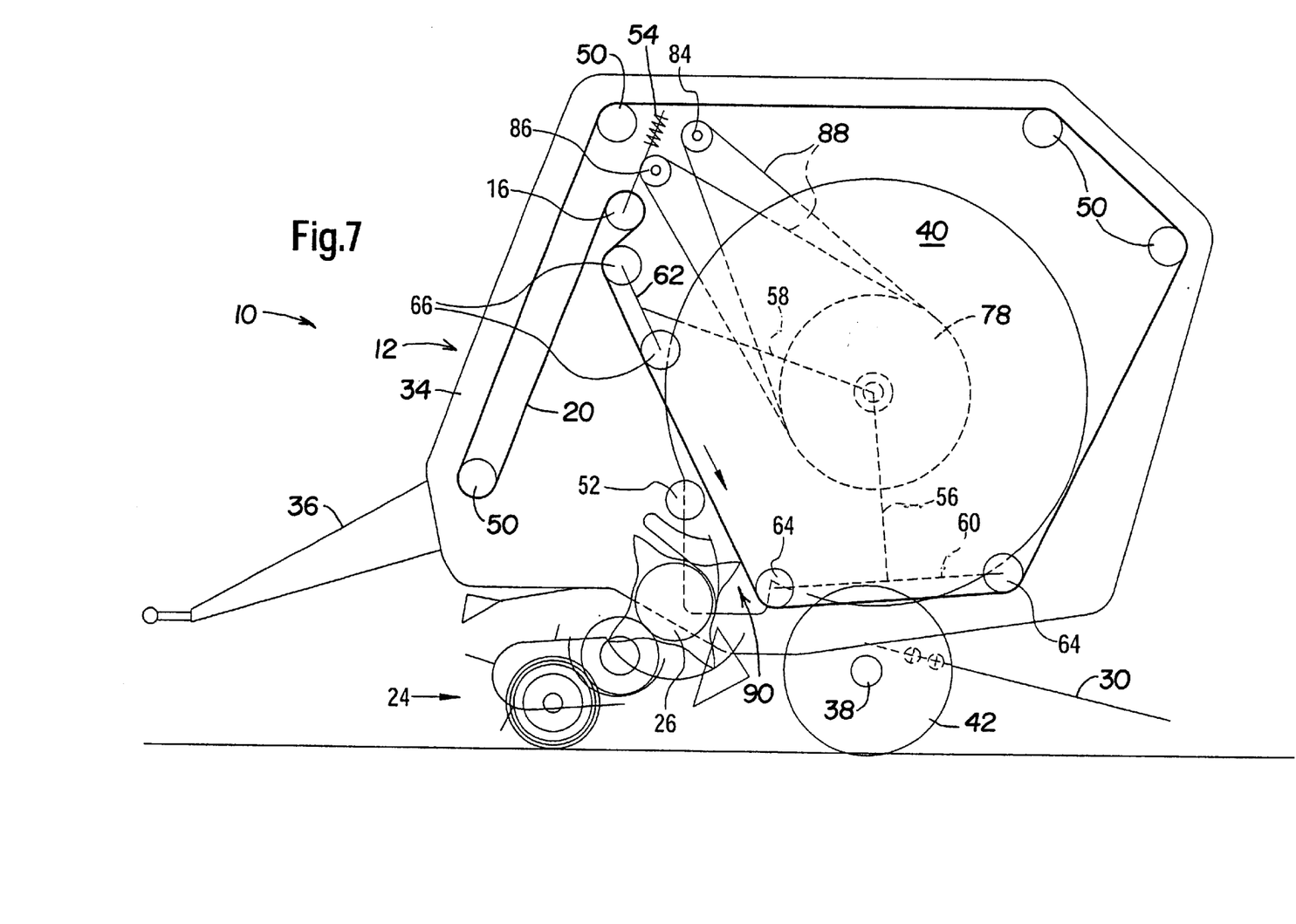
FIG. 7 is a schematic depiction of an empty round baler constructed according to a second embodiment and having a cutting device upstream of the bale chamber.
Figure 8:
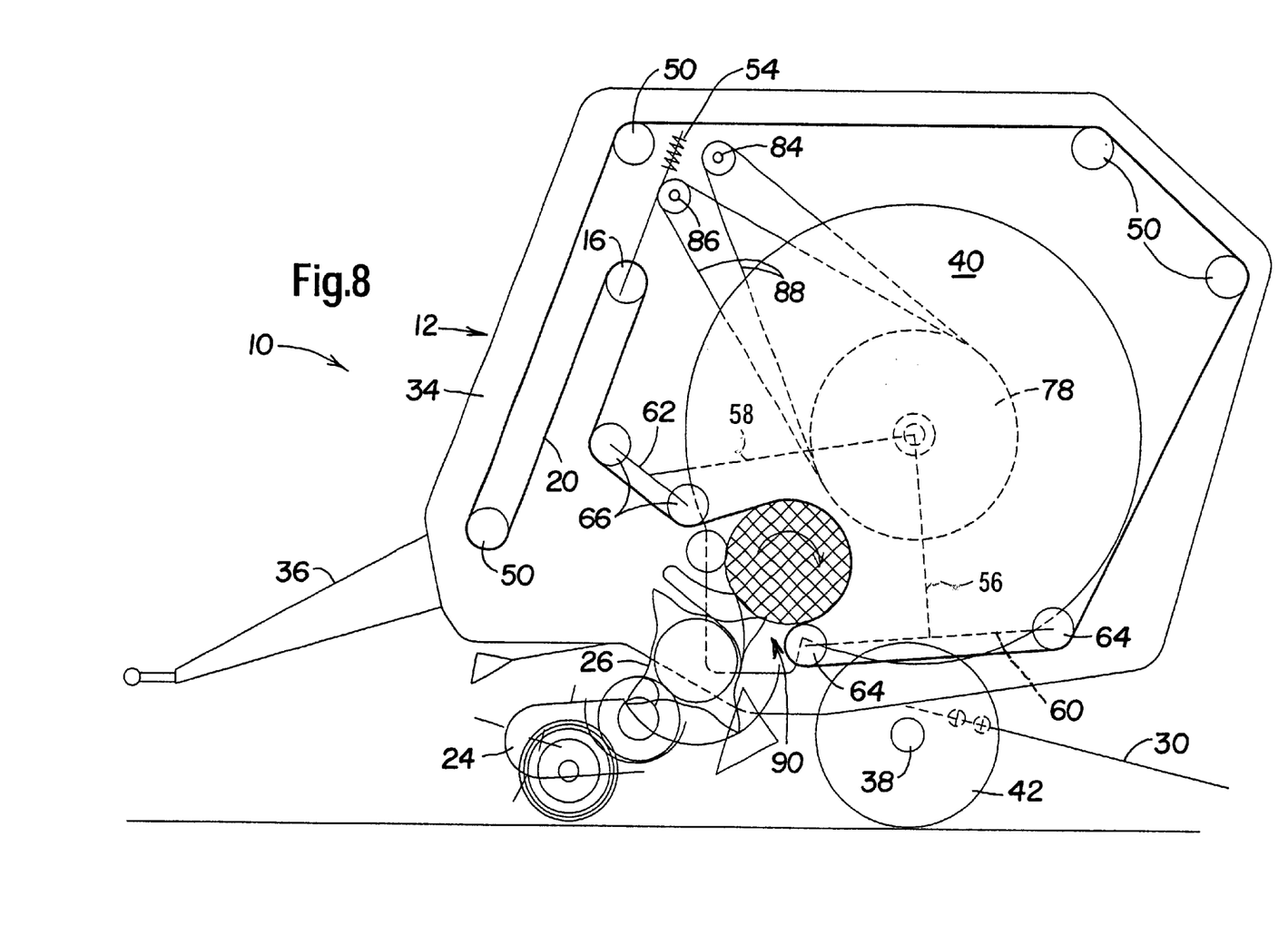
FIG. 8 is a view of the round baler of FIG. 7 showing a slightly filled bale chamber.
Figure 9:
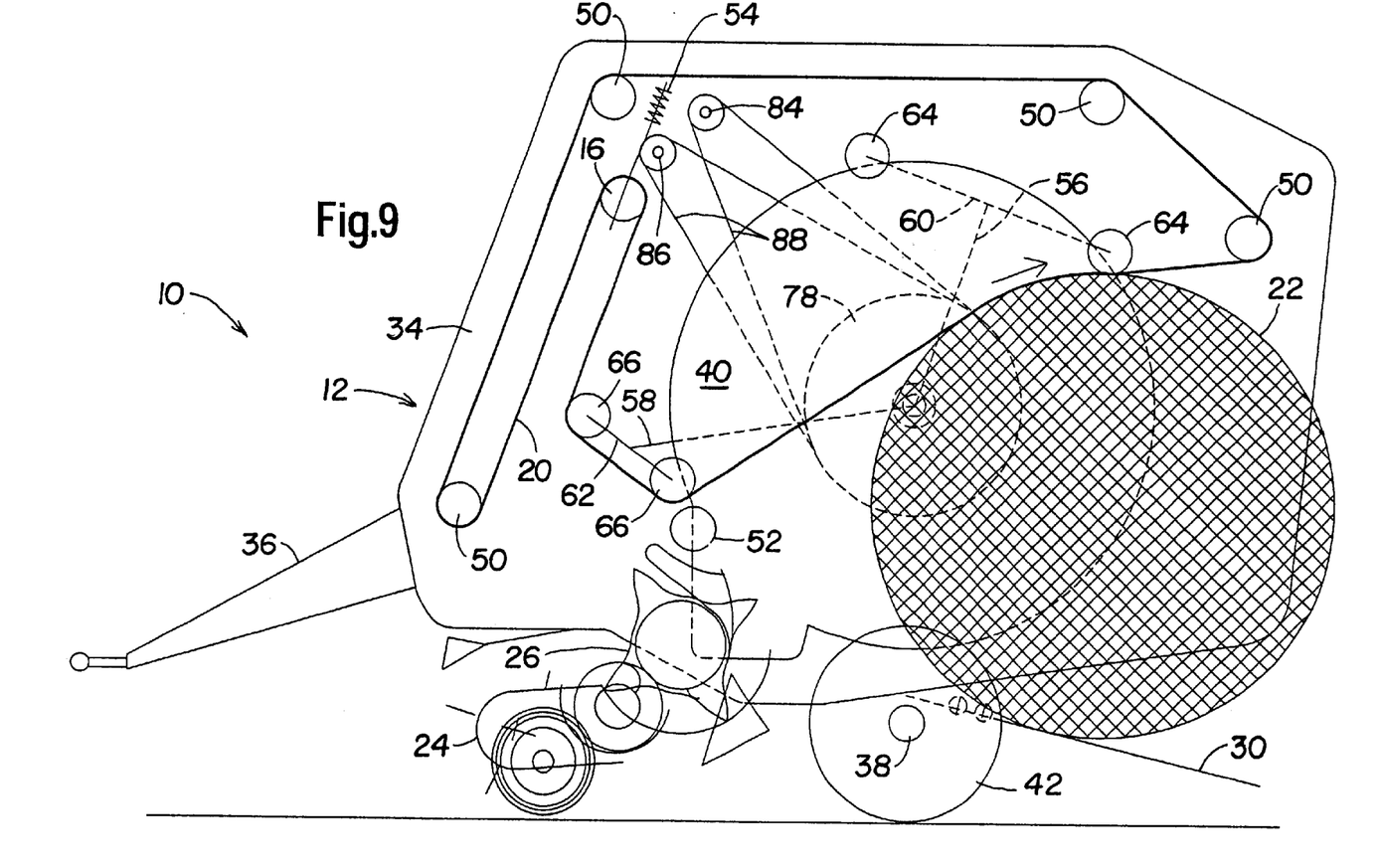
FIG. 9 is a view of the round baler of FIG. 7 showing the unloading of a bale.
Figure 10:
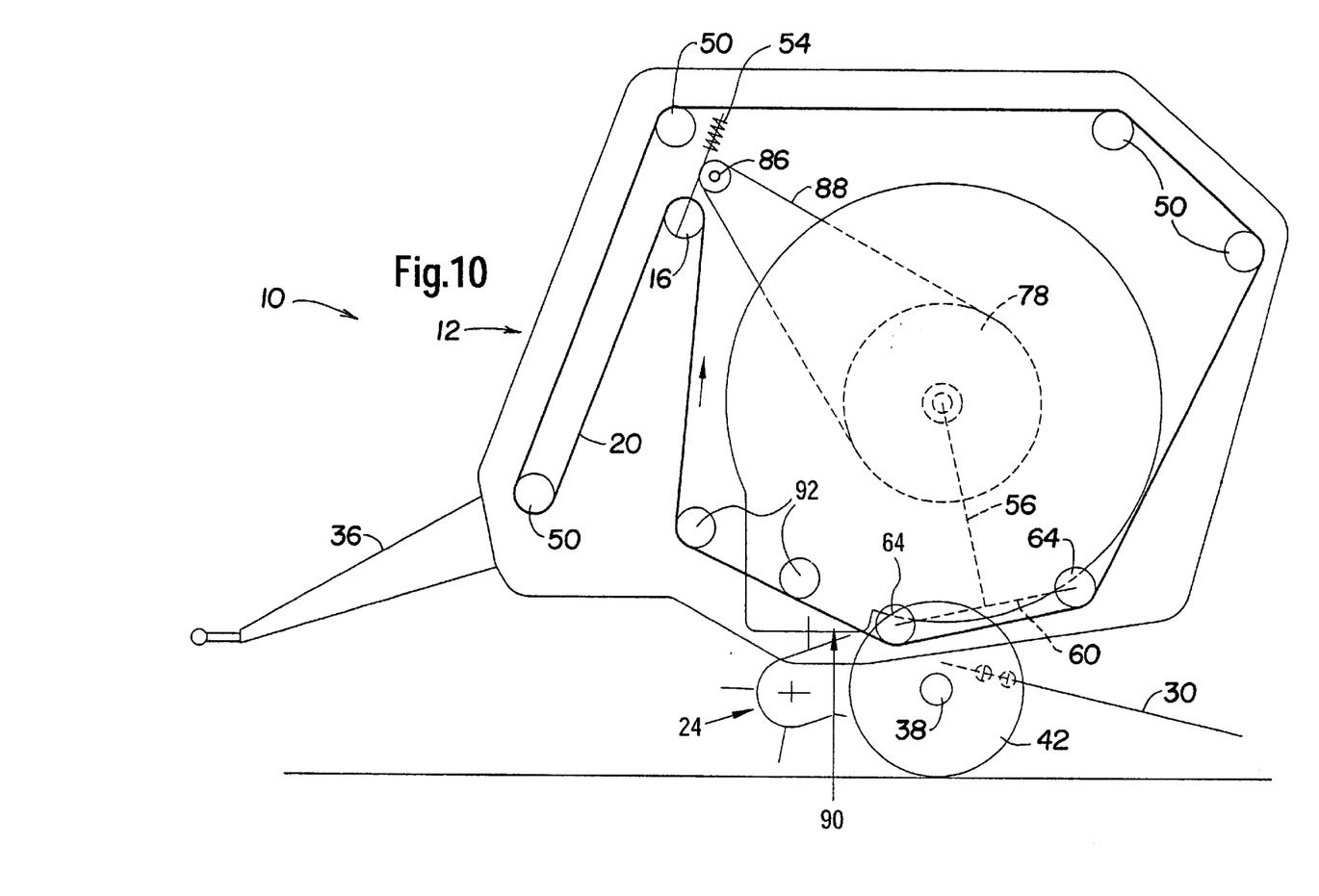
FIG. 10 is a schematic, side view of a round baler constructed according to a third embodiment.

The embodiment according to FIGS. 7 to 9 is very similar to the embodiment of FIGS. 1 to 6. However, in these figures, an intermediate conveyor 26 is provided downstream the pick-up 24, which replaces the lower starter roller 52. As a consequence thereof, only one starter roller 52 is provided, and the carrier 60 on the rear arms 56 provides for a greater distance between the rollers 64, such that the front roller 64 comes close to the delivery end of the intermediate conveyor 26. Furthermore, in an empty state of the round baler 10, the front arms 58 are raised to a higher position than in FIG. 1, such that the upper roller 66 comes very close to the moveable roller 16. Finally, the direction of movement of the flexible bale forming means 20 is contrary to the embodiment in FIGS. 1 to 6, i.e., counterclockwise.

Disregarding these differences, the round baler 10 according to FIGS. 7 to 9 is designed and acts in the same way as the one in FIGS. 1 to 6.

The round baler 10 according to FIGS. 10 to 13 is substantially of the same design as the round baler 10 according to FIGS. 1 to 6 with the following exceptions: the front pair of arms 58 is missing, the starter rollers 52 are replaced by two additional fixed rollers 92, the span of the bale forming means 20 engages the outer side of the additional fixed rollers 92 and the pick-up 24 as shown or an intermediate conveyor 26 are of a heavy design, which is useful to deflect the strand of the bale forming means 20 between the front roller 64 and the rear additional fixed roller 92. The advantage of this design is to have less components.

The additional fixed rollers 92 are of the same design as the remaining idler or drive rollers 50 and stay in place during the full baling cycle. A rear additional roller 92 assumes the place of the rear starter roller 52 and is located within the boundary of the side walls 40. The second and forward additional roller 92 is located in front of the side walls 40 outside the boundary or periphery of the side walls 40 in a plane slanted about 45° to the ground.

Figure 11:
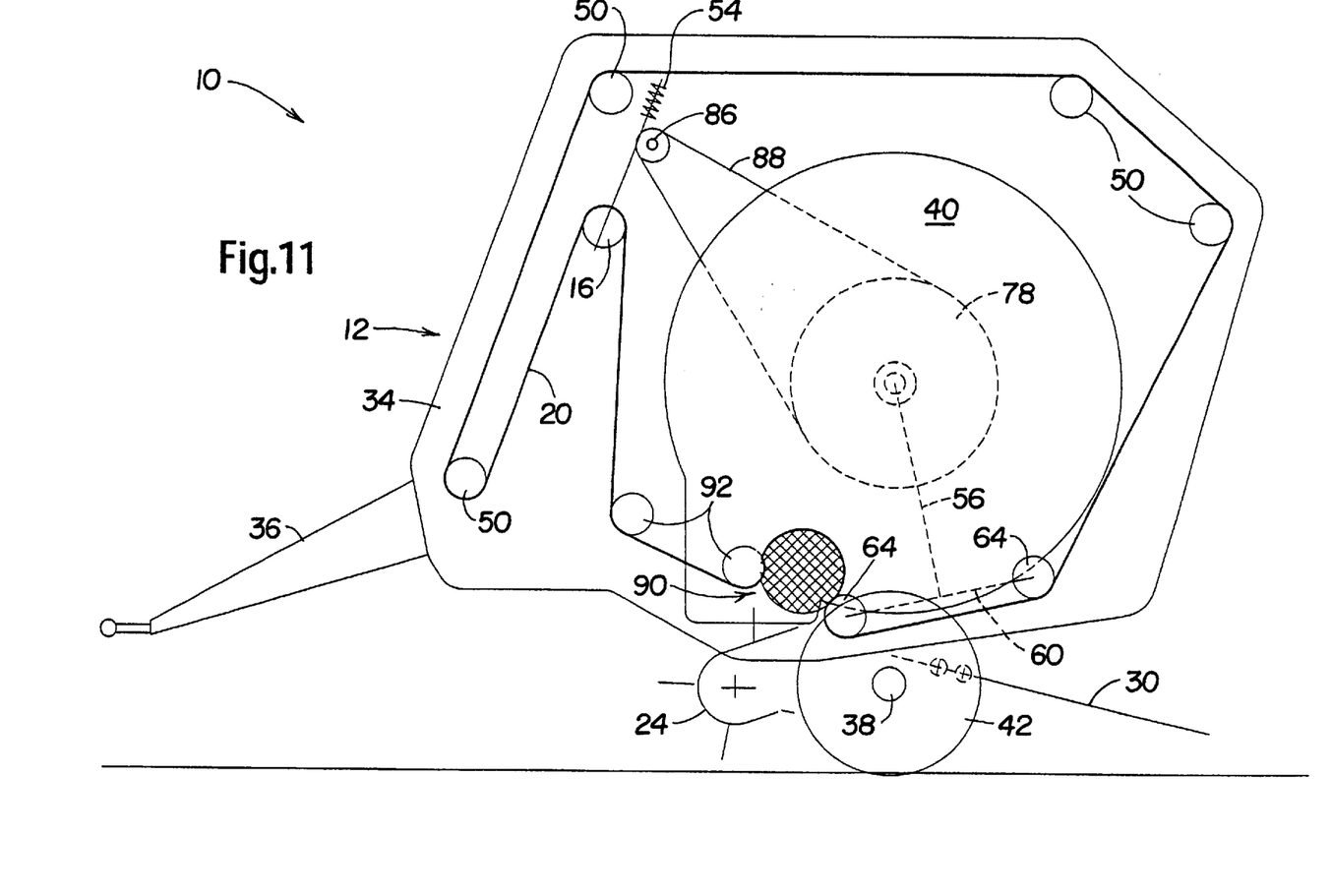
FIG. 11 is a view of the round baler of FIG. 10 showing a slightly filled bale chamber.
Figure 12:
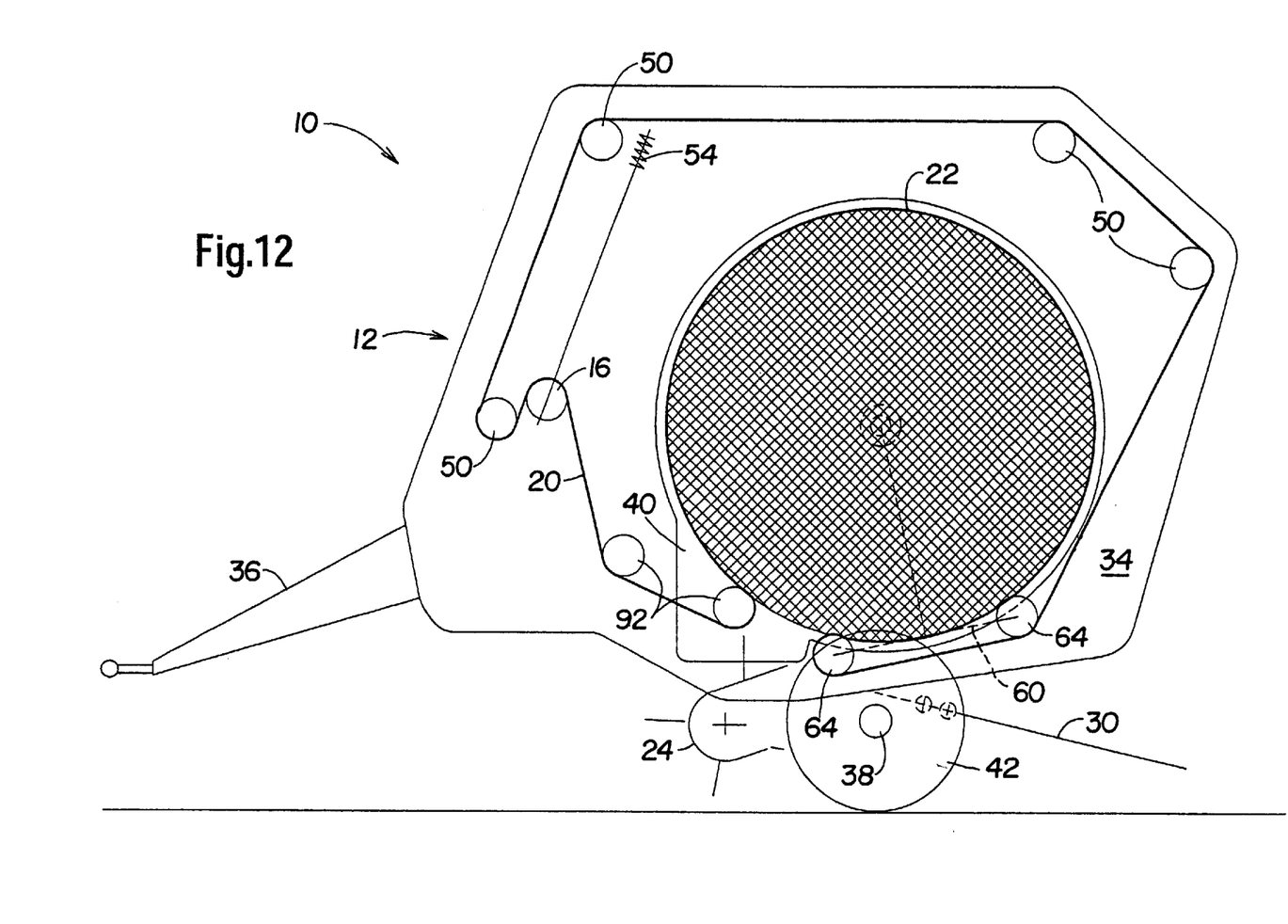
FIG. 12 is a view of the round baler of FIG. 10 showing a filled bale chamber.
Figure 13:
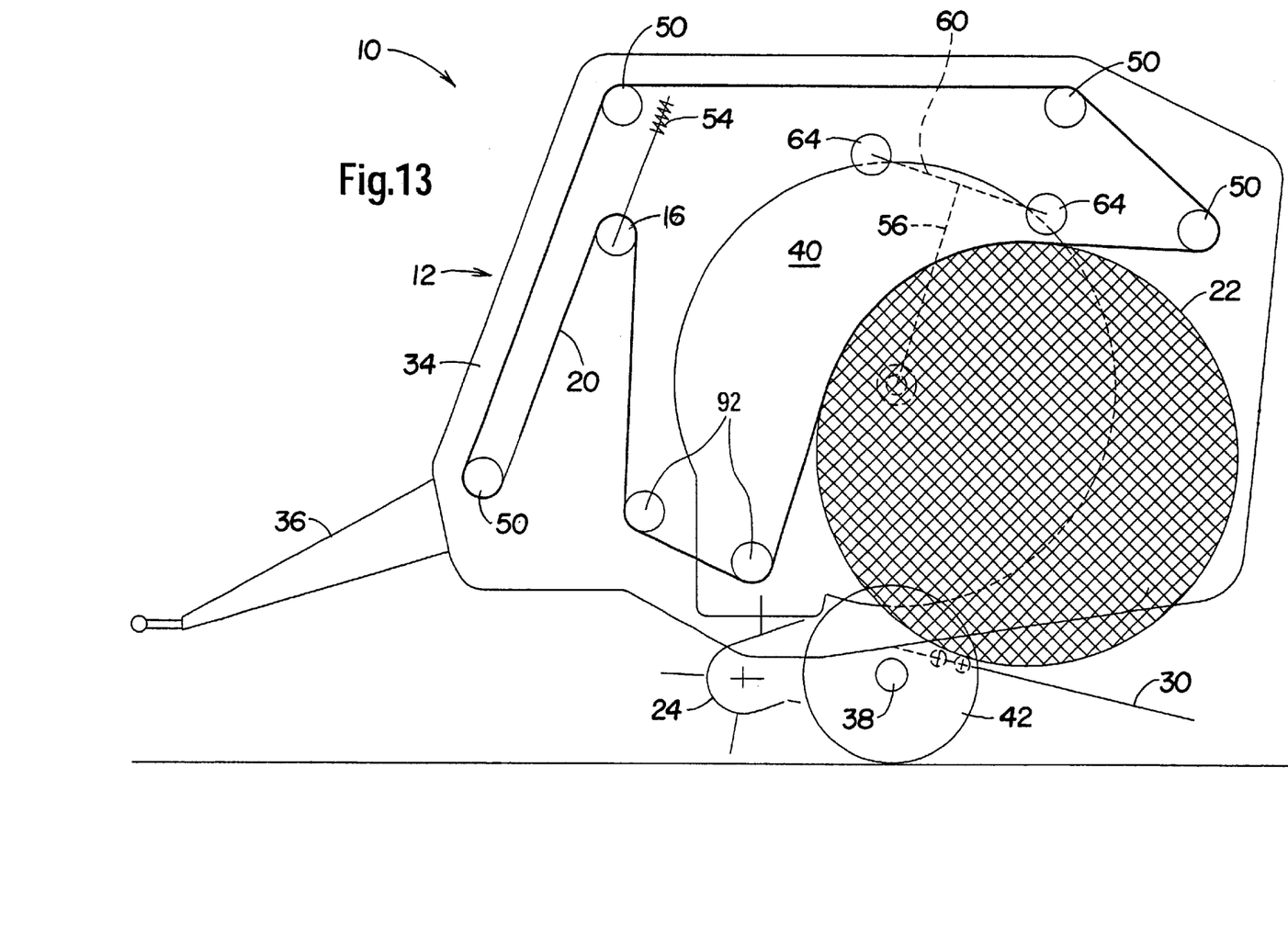
FIG. 13 is a view of the round baler of FIG. 10 showing the unloading of the bale.

The bale forming means 20 circulate in a clockwise direction with respect to the drawing. Contrary to the routing of the embodiment in FIGS. 1 to 6, in which the bale forming means 20 touch the side of the starter rollers 52 facing the bale chamber 28, in this embodiment the bale forming means 20 touch the side of the additional rollers 92 remote from the bale chamber and adjacent the pick-up 24 to form a wedge with it, in which the crop is rolled counterclockwise. As soon as the crop enters this wedge, a bale core is started and rolled and the bale forming means 20 deflect inwardly to form a loop, as seen in FIG. 11, which grows until it reaches a size as shown in FIG. 12. During the bale forming process, the bale 22 rests with its front part on the rear additional roller 92 and with its substantial part on the rolls 64 on the moveable arms 56.

The pick-up 24 is of such a stability and power, that incoming crop can be pushed sufficiently against the bale forming means 20 to start forming a bale core.

Having described the preferred embodiment, it will become apparent that various modifications can be made without departing from the scope of the invention as defined in the accompanying claims.

What is claimed is:

1. In a large round baler including a main frame supporting a baling chamber for forming cylindrical bales of different diameters up to a maximum diameter having a horizontal transverse axis located centrally in said baling chamber, and defined at least substantially by side walls and a flexible bale forming arrangement trained over a plurality of rollers including fixed rollers and at least one moveable roller, the improvement comprising:

a) said side walls each being constructed solely of a single piece rigidly fixed to said frame and having a continuous peripheral edge arranged radially outwardly about said horizontal transverse axis so as to be approximately at said maximum diameter;

b) said fixed rollers being spaced outside said peripheral edges of said pair of side walls from said axis and including a lower rear fixed roller located at a height for permitting a formed bale to be discharged beneath it, and further including a lower front fixed roller;

c) a pair of arms being respectively mounted outside said pair of side walls for movement relative thereto such that respective ends of said pair of arms may move adjacent to said peripheral edges of said pair of side walls;

d) said at least one moveable roller extending between and being mounted to said ends of said pair of arms and controlling the position of a length of said flexible bale forming arrangement, extending between said lower rear fixed roller and said moveable roller, relative to said side walls; and e) said arms being mounted for movement between a lowered, baling position, wherein said at least one moveable roller is positioned underneath said baling chamber in a position spaced rearward of said lower front fixed roller so as to define a crop inlet between said lower front fixed roller and said at least one moveable roller, and a raised bale discharge position, wherein said at least one moveable roller is elevated so as to permit a completed bale to pass beneath it.

2. The large round baler, as defined in claim 1, wherein two moveable rollers are mounted to said pair of arms, with a first of said two rollers being said at least one moveable roller.

3. The large round baler, as defined in claim 1, and further including a power actuator connected to said pair of arms for effecting and controlling movement of said pair of arms.

4. The large round baler, as defined in claim 1, and further including a second pair of arms mounted outside said pair of side walls for movement relative thereto such that respective ends of said second pair of arms may move adjacent said peripheral edges of said pair of side walls; and a further moveable roller extending between, and being mounted to, said ends of said second pair of arms.

5. The large round baler, as defined in claim 4, wherein the pairs of arms are all mounted for pivoting about said horizontal, transverse axis.

6. The large round baler, as defined in claim 5, wherein said frame includes a pair of shafts respectively mounted to respective outwardly facing sides of said pair of side walls such as to extend along said horizontal transverse axis; and the pairs of arms being respectively mounted for pivoting about said shafts.

7. The large round baler, as defined in claim 1, wherein said moveable rollers include a tension roller; and a biasing arrangement being coupled to said tension roller and exerting a force resisting movement of said tension roller in response to an expanding bale chamber.

8. The large round baler, as defined in claim 1, and further including a carrier mounted to each of said ends of said pair of arms; and said at least one roller extending between and being mounted to said carriers.

9. The large round baler, as defined in claim 8, wherein each said carrier is rigidly fixed to an associated one of said pair of arms.

* * * * *